US007056144B2

(12) United States Patent
Barsun et al.

(10) Patent No.: US 7,056,144 B2
(45) Date of Patent: Jun. 6, 2006

(54) OFFSET COMPENSATION SYSTEM

(75) Inventors: Stephan K. Barsun, Sacramento, CA (US); Bryan D. Bolich, Davis, CA (US); Alisa C. Sandoval, Grass Valley, CA (US); Gregory S. Meyer, Roseville, CA (US); Richard A. Miner, Elverta, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 16 days.

(21) Appl. No.: 10/782,700

(22) Filed: Feb. 19, 2004

(65) Prior Publication Data

US 2005/0186831 A1    Aug. 25, 2005

(51) Int. Cl.
*H01R 13/627* (2006.01)
*H01R 13/00* (2006.01)
*H05K 1/00* (2006.01)

(52) U.S. Cl. .................. 439/362; 439/485; 439/526
(58) Field of Classification Search ............... 439/362, 439/378, 66, 72, 485, 487, 526
See application file for complete search history.

(56) References Cited

U.S. PATENT DOCUMENTS

| 4,321,423 | A |   | 3/1982  | Johnson et al.       |
|-----------|---|---|---------|----------------------|
| 4,403,102 | A |   | 9/1983  | Jordan et al.        |
| 4,487,300 | A |   | 12/1984 | Hammond              |
| 4,631,639 | A |   | 12/1986 | Biraud               |
| 4,665,467 | A |   | 5/1987  | Speraw et al.        |
| 4,703,567 | A |   | 11/1987 | Moore et al.         |
| 4,709,302 | A |   | 11/1987 | Jordan et al.        |
| 4,721,996 | A |   | 1/1988  | Tustaniwskyj et al.  |
| 4,942,498 | A |   | 7/1990  | Toussaint            |
| 4,951,176 | A |   | 8/1990  | Bergfried et al.     |
| 4,953,061 | A |   | 8/1990  | Nitkiewicz           |
| 5,045,976 | A |   | 9/1991  | Guilleminot          |
| 5,050,038 | A |   | 9/1991  | Malaurie et al.      |
| 5,144,535 | A |   | 9/1992  | Megens et al.        |
| 5,179,506 | A |   | 1/1993  | Corbett et al.       |
| 5,206,792 | A |   | 4/1993  | Reynolds             |
| 5,221,811 | A |   | 6/1993  | Seldin               |
| 5,274,193 | A |   | 12/1993 | Bailey et al.        |
| 5,276,585 | A |   | 1/1994  | Smithers             |
| 5,311,395 | A |   | 5/1994  | McGaha et al.        |
| 5,365,408 | A |   | 11/1994 | Apitz                |
| 5,379,188 | A |   | 1/1995  | Winslow              |
| 5,477,420 | A |   | 12/1995 | Brooks               |
| 5,548,487 | A |   | 8/1996  | Brabetz et al.       |
| 5,651,688 | A |   | 7/1997  | Lin                  |
| 5,742,844 | A |   | 4/1998  | Feldman              |
| 5,748,446 | A |   | 5/1998  | Feightner et al.     |
| 5,754,400 | A | * | 5/1998  | Sathe et al. .................. 361/704 |
| 5,764,485 | A |   | 6/1998  | Lebaschi             |

(Continued)

OTHER PUBLICATIONS

PEM Bulletin ALA "Floating Self-Clinching Fasteners" PEM Fastening Systems, Danboro, PA, pp. 1-4, 1997.

(Continued)

*Primary Examiner*—Chnadrika Prasad (57) ABSTRACT

A computing system includes a circuit board, a first connector portion electrically connected to the circuit board, an electronic component and a plurality of resilient support members. The electronic component includes a first electronic device, a second connector portion electrically coupled to the electronic device and connected to the first connector portion along an axis. The plurality of resilient support members are asymmetrically located about the axis and extend between the device and the circuit board.

42 Claims, 6 Drawing Sheets

U.S. PATENT DOCUMENTS

| | | | |
|---|---|---|---|
| 5,870,287 A | 2/1999 | Rodriguez et al. | |
| 5,886,871 A | 3/1999 | Jeffries et al. | |
| 5,896,270 A | 4/1999 | Tsui | |
| 5,901,039 A * | 5/1999 | Dehaine et al. | 361/704 |
| 5,920,120 A | 7/1999 | Webb et al. | |
| 5,928,024 A | 7/1999 | Ming-Huang | |
| 5,930,114 A | 7/1999 | Kuzmin et al. | |
| 5,940,269 A | 8/1999 | Ko et al. | |
| 5,940,279 A | 8/1999 | Gademann et al. | |
| 5,958,556 A | 9/1999 | McCutcheon | |
| 5,966,289 A | 10/1999 | Hastings et al. | |
| 5,986,887 A | 11/1999 | Smith et al. | |
| 5,991,154 A | 11/1999 | Clemens et al. | |
| 6,023,413 A * | 2/2000 | Umezawa | 361/697 |
| 6,055,158 A | 4/2000 | Pavlovic | |
| 6,067,231 A | 5/2000 | Lu | |
| 6,075,208 A | 6/2000 | Persson | |
| 6,075,710 A | 6/2000 | Lau | |
| 6,084,781 A | 7/2000 | Klein | |
| 6,108,205 A | 8/2000 | Bergstedt | |
| 6,125,038 A | 9/2000 | Amaro et al. | |
| 6,128,200 A | 10/2000 | Chu | |
| 6,144,092 A | 11/2000 | Kappes et al. | |
| 6,147,873 A | 11/2000 | Huang | |
| 6,169,659 B1 | 1/2001 | Wheaton | |
| 6,191,944 B1 | 2/2001 | Hammel et al. | |
| 6,208,518 B1 | 3/2001 | Lee | |
| 6,215,667 B1 | 4/2001 | Ady et al. | |
| 6,229,705 B1 | 5/2001 | Lee | |
| 6,233,152 B1 | 5/2001 | Abbott et al. | |
| 6,239,974 B1 | 5/2001 | Tseng | |
| 6,275,380 B1 | 8/2001 | Bollesen | |
| 6,278,615 B1 | 8/2001 | Brezina et al. | |
| 6,280,116 B1 | 8/2001 | Szu | |
| 6,285,554 B1 | 9/2001 | Westberg | |
| 6,297,444 B1 | 10/2001 | Chuang et al. | |
| 6,301,115 B1 | 10/2001 | Hashimoto et al. | |
| 6,302,702 B1 * | 10/2001 | Audet et al. | 439/66 |
| 6,304,449 B1 | 10/2001 | Zhang | |
| 6,304,453 B1 | 10/2001 | Lo | |
| 6,305,966 B1 | 10/2001 | Arbogast et al. | |
| 6,310,771 B1 | 10/2001 | Chien | |
| 6,310,779 B1 | 10/2001 | Wang | |
| 6,320,748 B1 | 11/2001 | Roden et al. | |
| 6,330,908 B1 | 12/2001 | Lee et al. | |
| 6,330,996 B1 | 12/2001 | Yo et al. | |
| 6,343,016 B1 | 1/2002 | Lin | |
| 6,356,445 B1 | 3/2002 | Mochzuki et al. | |
| 6,362,978 B1 | 3/2002 | Boe | |
| 6,424,537 B1 | 7/2002 | Paquin et al. | |
| 6,424,538 B1 | 7/2002 | Paquin | |
| 6,426,875 B1 | 7/2002 | Akram et al. | |
| 6,428,352 B1 | 8/2002 | Boyden | |
| 6,434,007 B1 | 8/2002 | Salmonson et al. | |
| 6,452,801 B1 | 9/2002 | Chen | |
| 6,456,493 B1 | 9/2002 | Lee | |
| 6,459,584 B1 | 10/2002 | Kuo | |
| 6,477,058 B1 * | 11/2002 | Luebs et al. | 361/784 |
| 6,483,704 B1 | 11/2002 | Ulen et al. | |
| 6,487,082 B1 | 11/2002 | Crapisi et al. | |
| 6,496,372 B1 | 12/2002 | Davison et al. | |
| 6,496,374 B1 | 12/2002 | Caldwell | |
| 6,501,657 B1 | 12/2002 | Carr | |
| 6,501,658 B1 * | 12/2002 | Pearson et al. | 361/709 |
| 6,525,938 B1 | 2/2003 | Chen | |
| 6,542,368 B1 | 4/2003 | Miyazawa | |
| 6,542,369 B1 | 4/2003 | Wu | |
| 6,563,213 B1 | 5/2003 | Wong et al. | |
| 6,563,712 B1 | 5/2003 | Akram et al. | |
| 6,570,763 B1 | 5/2003 | McHugh et al. | |
| 6,590,772 B1 | 7/2003 | Ju | |
| 2005/0057907 A1 * | 3/2005 | Meyer et al. | 361/785 |

OTHER PUBLICATIONS

PEM Bulletin CL 602, Self-Clinching Nuts, PEM Fastening Systems, 2000, 12 pages.

PEM Bulletin SK102, Keyhole Self-Clinching Standoffs, PEM Fastening Systems, 1997, 4 pages.

PEM Bulletin CH 1200, Concealed-Head Self-Clinching Studs & Standoffs, PennEngineering, 1997, 6 pages.

PEM Bulletin SO701, Self-Clinching Standoffs, PEM Fastening Systems, 1997, 12 pages.

PEM Bulletin K602, Fasteners for Use in or with PC Boards, PEM Fastening Systems, 1997, 12 pages.

* cited by examiner

OFFSET COMPENSATION SYSTEM

BACKGROUND OF THE INVENTION

Computing systems, such as servers, typically include at least one circuit board, a frame supporting the circuit board and a plurality of electronic components, such as processor components, connected to the circuit board. The electronic component is typically electrically connected to the circuit board utilizing a pin and socket connector or other socket arrangement. In many components, the pin and socket arrangement is not centered with respect to the remainder of the electronic component. As a result, the component is not balanced about the connector arrangement which results in the component tending to tilt, making insertion of the pins into the socket difficult. This misalignment of the pins and sockets results in damage to the pins or poor electrical connection between the circuit board and the electronic component.

SUMMARY OF THE INVENTION

According to one exemplary embodiment, a computing system includes a circuit board, a first connector portion electrically connected to the circuit board and an electronic component. The electronic component includes a first electronic device, a second connector portion electrically coupled to the electronic device and connected to the first connector portion along an axis and a plurality of resilient support members asymmetrically located about the axis and extending between the device and the circuit board.

BRIEF DESCRIPTION OF THE DRAWINGS

FIG. 7 further illustrates a second alternative embodiment of the offset compensation system of FIGS. 1–5 incorporated into the alignment assist system and interacting with the circuit board and the electronic component prior to connection of connector portions associated with the electronic component and the circuit board.

DETAILED DESCRIPTION OF EXAMPLE EMBODIMENTS

Figure 1:
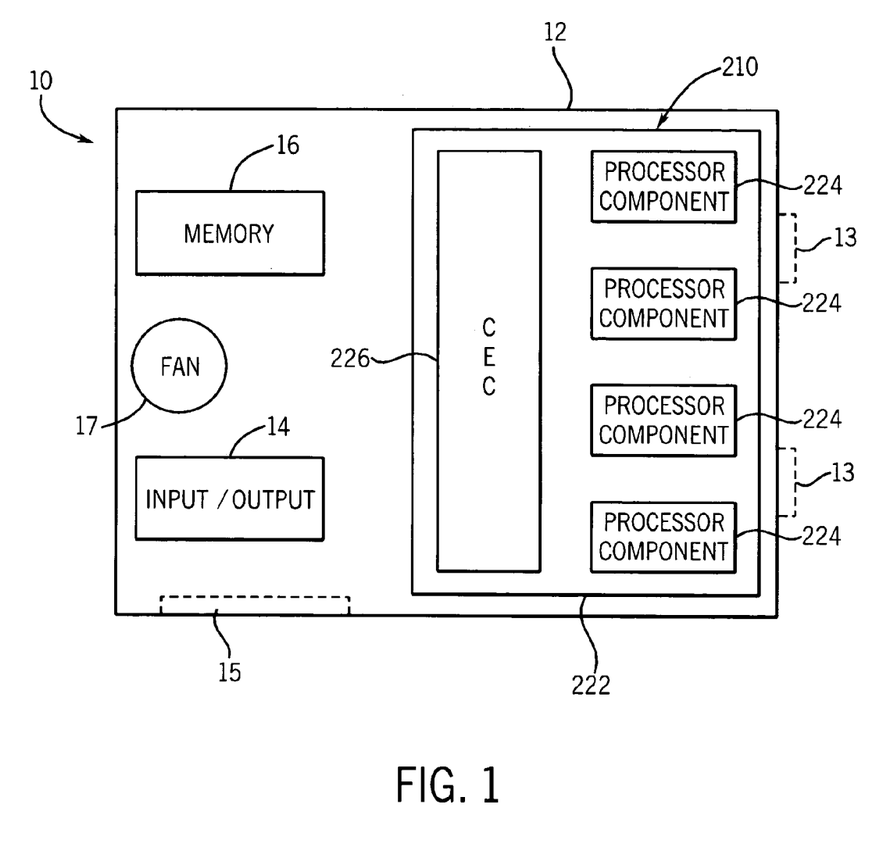
FIG. 1 is a schematic illustration of one embodiment of a computing system of the present invention.

FIG. 1 schematically illustrates computing system 10. Computing system 10 (shown as a server) generally includes baseboard 12, input/output 14, memory 16, cooling fan 17 and processor system 210. Baseboard 12 connects input/output 14, memory 16 and processor system 210. Baseboard 12 comprises a circuit board and serves as an electronic highway between the remaining electronic components of system 10. Although computing system 10 is generally illustrated as a planar system, baseboard 12 may additionally include connectors 13 (shown with broken lines) for enabling baseboard 12 to be connected to a backplane such as when computing system 10 comprises a multi-board system.

Input/output 14 generally comprises an input/output board coupled to baseboard 12. The input/output board supports a plurality of input/output cards. Input/output 14 facilitates the use of additional peripherals such as tape drives, DVDs, and the like with computing system 10. In alternative embodiments, computing system 10 may additionally or alternatively include input/output connectors 15 (illustrated with broken lines) for connection to external input/output boards or cards.

Memory 16 is coupled to baseboard 12 and provides additional memory storage for computing system 10. For purposes of this disclosure, the term "coupled" means the joining of two or more members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. In the particular embodiment shown, memory 16 comprises two memory extenders or circuit boards carrying a plurality of memory cards.

Cooling fan or fans 17 comprises one or more fans provided within computing system 10 and configured to direct air through system 10 so as to cool and dissipate heat away from the internal components of system 10. Although cooling fan 17 is schematically illustrated between input/output 14 and memory 16, cooling fan 17 may be located in a variety of locations within system 10. For example, cooling fan 17 may be positioned proximate to processor system 210 to cool the electronic devices of processor system 210. In alternative embodiments, cooling fan 17 may comprise one or more fans remote to baseboard 12, wherein cooling fan 17 is sized and located to cool the entire computing system.

Processor system 210 does much of the computing or calculations for computing system 10 and generally includes a processor board or circuit board 222, a plurality of processor components 224 and a control 226. Circuit board 222 comprises a conventionally known or future developed circuit board (also known as a printed circuit assembly) capable of serving as an interface between the various elements connected to circuit board 222. Circuit board 222 is coupled to baseboard 12 and electronically connects each of processor components 224 to control 226. In one embodiment, two processor components 224 extend on a first side of circuit board 222, and two processor components 224 extend on an opposite second side of circuit board 222. In the schematic depiction, circuit board 222 may extend either parallel or perpendicular to baseboard 12. In alternative embodiments, the functions of baseboard 12 and circuit board 222 may be provided by a single circuit board, enabling one of baseboard 12 and circuit board 222 to be eliminated. For example, input/output 14, memory 16, fan 17, processor components 224 and controller 226 may alternatively electronically connected to a single circuit board.

Control 226 serves as a traffic cop between each of the processor components 224, memory 16 and input/output 14. In one particular embodiment, control 226 comprises a chip set such as a core electronic complex chip set or a central electronic complex chip set. In alternative embodiments, control 226 may be omitted where processor components 224, memory 16 and input/output 14 may directly communicate with one another. Although not shown, computer system may additionally include a power supply for supplying power to devices other than components 224 and a housing for enclosing and supporting each of the components. Overall, input/output 14, memory 16 and processor system 210 cooperate with one another to provide information retrieval and processing.

FIGS. 2–5 illustrate one embodiment of processor system 210 in greater detail. As best shown by FIGS. 2–5, processor system 210 includes control 226, circuit board 222, frame 223, processor component 224, connector portion 228, alignment assist system 231, component support system 232, and offset compensation system 233. Control 226 and circuit board 222 are generally described above with respect to FIG. 1. However, in the particular embodiment illustrated in FIGS. 2–5, circuit board 222 is specifically configured to be coupled to four processor components 224 with two processor components 224 on a first side of circuit board 222 and two processor components 224 on a second opposite side of circuit board 222. For ease of illustration, only a single processor component 224 is shown. In alternative embodiments, circuit board 222 may be configured to be connected to a fewer or greater number of processor components 224.

Frame 223 generally comprises a relatively rigid structure extending about a perimeter of circuit board 222 along both faces of circuit board 222. In the particular embodiment illustrated, frame 223 is formed from sheet metal. In alternative embodiments, frame 223 may be formed from other materials and may be cast. In alternative embodiments, frame 223 may have a variety of alternative shapes and configurations depending upon the support requirements of circuit board 222.

Processor component 224 is configured to be releasably mounted to circuit board 222 and generally includes processor assembly 234, connector portion 235, heat sink assembly 236 and power supply 237. Processor assembly 234 includes a conventionally known or future developed processor device such as an integrated circuit chip 238 (shown in FIG. 3) configured to process information provided to it through circuit board 222. The circuit chip 238 is mounted upon a circuit board 240 by which the chip is connected to connector portion 235.

Connector portion 235 comprises a portion of a connector electrically connected to the processor device of processor assembly 234 and further configured to be electrically connected to circuit board 222 by connector portion 228. Connector portion 235 is configured to be directly connected to connector portion 228 along a connection axis 244 equidistantly spaced from a perimeter of connector portion 235 and generally extending perpendicular to connector portions 228 and 235. As best by FIG. 3, connection axis 244 is longitudinally spaced from end 246 by a distance D1 and is longitudinally spaced from a second opposite end 248 by a distance D2. Distance D1 is greater than distance D2. Processor component 224 has a center of mass or center of gravity generally located along axis 250. Axis 250 is longitudinally spaced from end 246 by a distance D3, is longitudinally spaced from end 248 by a distance D4 and is longitudinally spaced from connection axis 244 by a distance D5. Because connector axis 244 is offset from axis 250, component 224 tends to pivot or tilt about a pivot or fulcrum along pivot axis 252 which extends perpendicular to and within the same plane as connection axis 244. As will described in greater detail hereafter, offset compensation system 233 compensates for this tilt to facilitate the proper alignment of connector portion 235 with connector portion 228.

Connector portions 228 and 235 are configured to interact with one another to connect processor assembly 234 to circuit board 222 and to facilitate the transmission of signals therebetween. In the particular embodiment illustrated, connector portion 228 is coupled to circuit board 222 and includes a plurality of sockets. Connector portion 235 is coupled to component 224 and includes a plurality of pins which are received within the plurality of sockets of connector portion 228. In the particular embodiment, connector portions 228 and 235 comprise a conventionally known zero-in-force (ZIF) connector sold by Tyco and Foxcom for use with Intel 64 bit processors. In alternative embodiments, connector portions 228 and 235 may comprise other connection devices configured to facilitate the transmission of signals between circuit board 222 and processor assembly 234.

Figure 2:
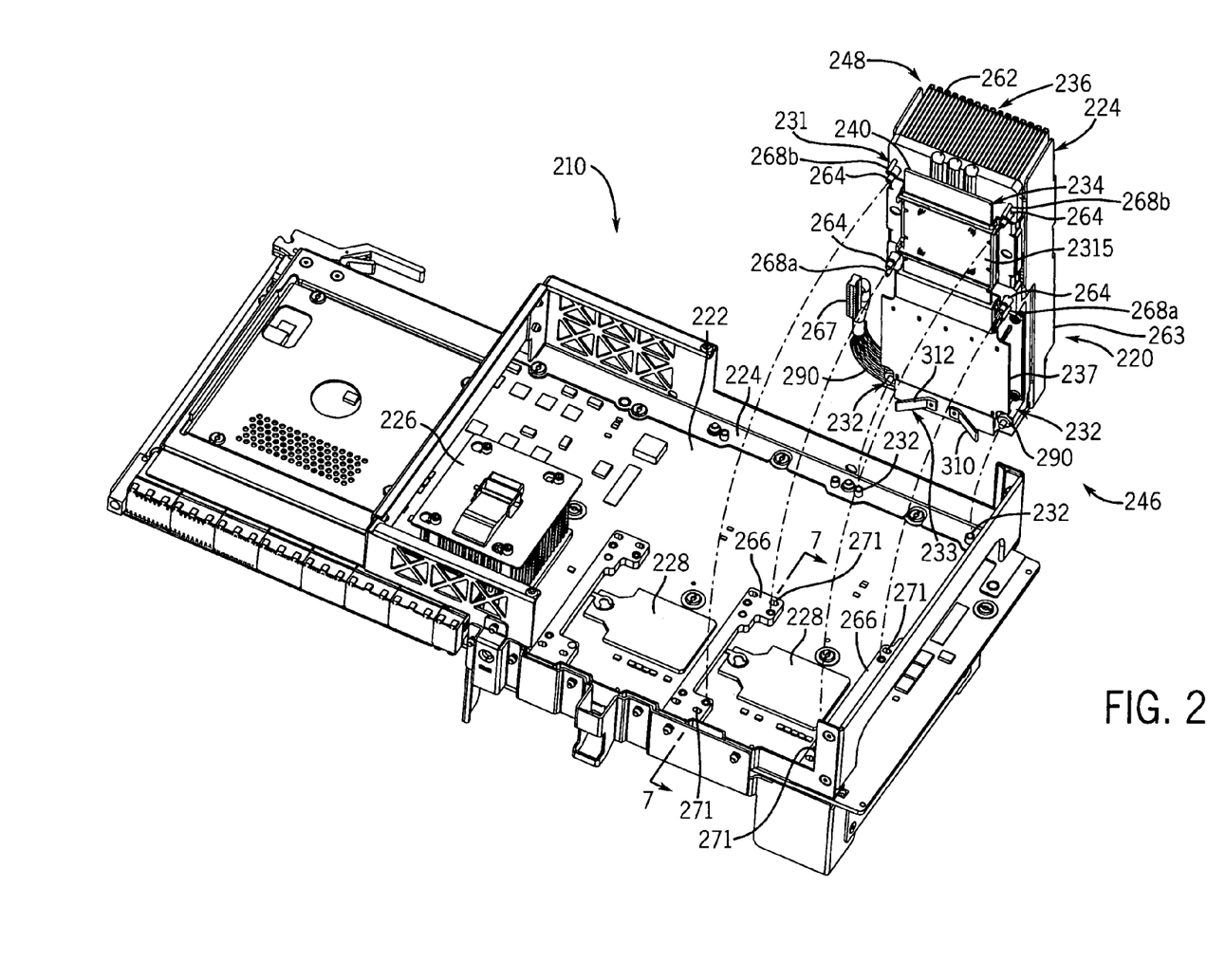
FIG. 2 is a partially exploded top perspective view of one embodiment of the computing system of FIG. 1 depicting an electronic component separated from a circuit board.

As best shown by FIG. 2, heat sink assembly 236 includes heat sinks 262, 263 and heat sink mounting members 264. Heat sinks 263, 262 generally comprise structures thermally coupled to integrated circuit chip 238 of processor assembly 234 and to power supply 237 to dissipate heat generated by processor assembly 234 and by power supply 237, respectively. In the embodiment shown, heat sinks 262, 263 are adjacent the circuit chip and power supply 237. In lieu of distinct heat sinks 262 for processor assembly 234 and for power supply 237, component 224 may utilize a common heat sink for both processor assembly 234 and power supply 237. In one embodiment, a portion of one of heat sinks 262 may extend across and about the other of heat sinks 262. An example of such an arrangement is disclosed in co-pending U.S. patent application Ser. No. 10/803,399 entitled "Heat Dissipating Arrangement" filed on Mar. 18, 2004 by Stephan K. Barsun, Christian L. Belady, Roy M. Zeighami and Christopher G. Malone, the full disclosure of which is hereby incorporated by reference.

Mounting members 264 generally comprise projections or members extending from heat sink 262 about connector portion 235. Mounting members 264 include threaded portions that are screwed into brackets 266 which are secured to frame 223 and which extend about connector portion 228. In alternative embodiments, mounting members 264 may be screwed to standoffs or other structures. In the particular embodiment illustrated, heat sink assembly 236 includes four mounting members 264 located at each corner of connector portion 235. One example of a mounting member 264 (also known as a mounting portion) is described in co-pending U.S. patent application Ser. No. 10/661,433 filed on Sep. 12, 2003 by Gregory S. Meyer and Alisa C. Sandoval, and entitled "Circuit Board Assembly," the full disclosure of which is hereby incorporated by reference.

Power supply 237 comprises a conventionally known or future developed device configured to transmit power to processor assembly 234. Power supply 237 is secured adjacent to heat sink 262 generally between heat sink 262 and circuit board 222. Power supply 237 is connected to circuit board 222 by cabling 267. Because power supply 237 is generally suspended above circuit board 222, the weight of power supply 237 and an adjacent portion of heat sink 262 are generally suspended or cantilevered with respect to circuit board 222. As will be described in greater detail hereafter, support system 232 supports this cantilevered mass relative to circuit board 222 to minimize pivoting of connector portions 228 and 235 about the resulting fulcrum and to avoid potential damage to connector portions 228 and 235. In alternative applications, power supply 237 may be provided by a separate component coupled to circuit board 22, wherein system 32 supports a cantilevered mass of heat sink 262.

Figure 5:
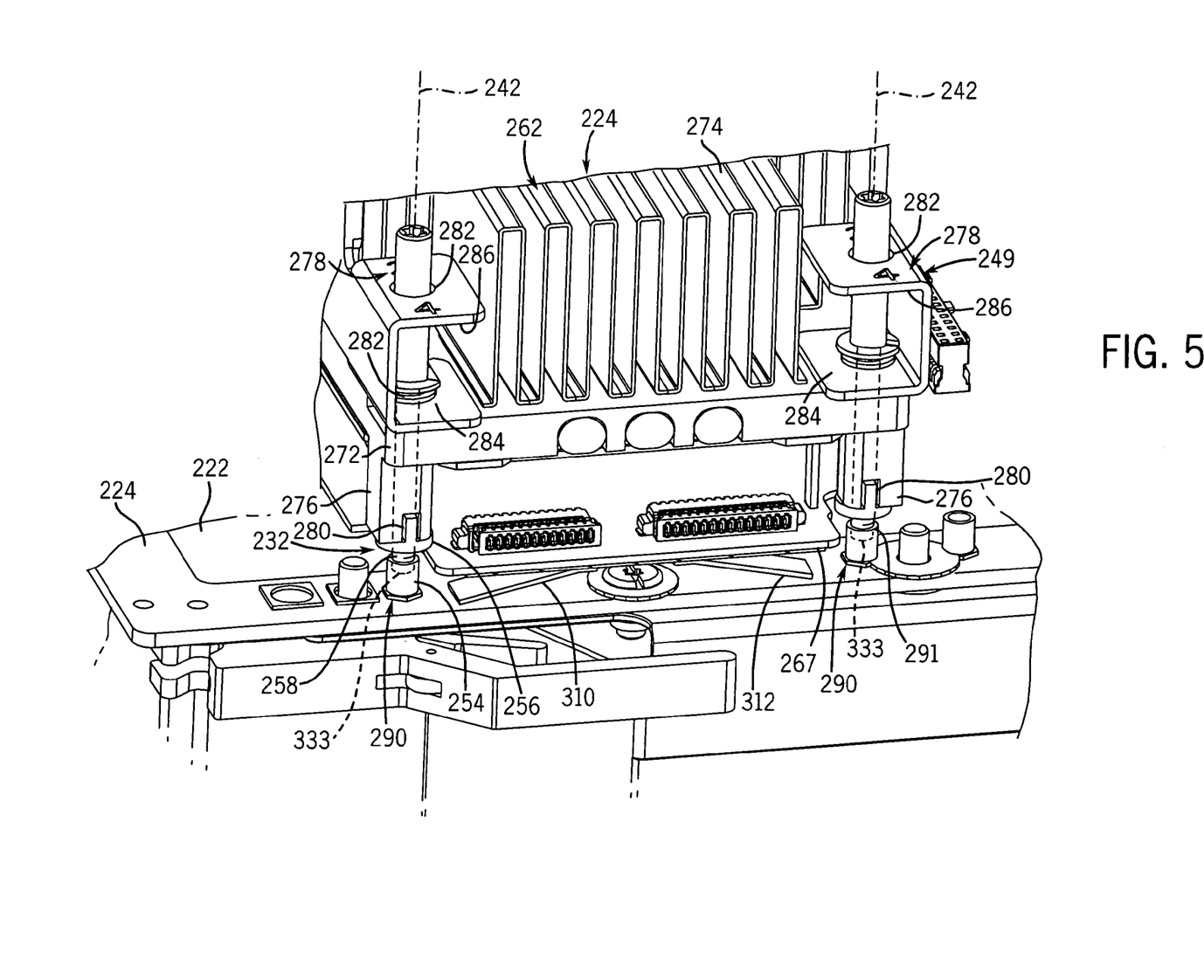
FIG. 5 is a fragmentary side perspective view of one end of the computing system of FIG. 4.

As shown in FIG. 5, heat sink 262 includes platform 272, cooling fins 274, post 276 and brackets 278. Platform 272 generally comprises a structure or base formed of one or more highly thermally conductive materials to which processor assembly 234 and power supply 237 are mounted. Platform 272 additionally supports cooling fins 274, posts 276 and brackets 278. Platform 272 may have a variety of sizes and configurations depending upon the size and configuration of processor assembly 234 and power supply 237.

Posts 276 extend from platform 272 towards circuit board 222 and frame 223. In the particular embodiment illustrated, posts 276 are integrally formed as part of a single unitary body with platform 272. In alternative embodiments, posts 276 may be mounted, welded, adhered or fastened to platform 272. Posts 276 interact with and receive portions of support system 232. In particular, each post 276 includes a pair of openings 280 which interact with portions of a support system 232 to prevent complete rotation of those portions of support system 232.

Cooling fins 274 are coupled to platform 272 and extend generally opposite to processor assembly 234 and power supply 237. Cooling fins 262 provide an enlarged surface area for the dissipation of heat.

Brackets 278 extend along opposite edges of platform 272 and are configured to interact with portions of support system 232. In particular, each bracket 278 includes a pair of aligned openings 282 through which portions of support system 232 extend. In addition, brackets 278 include opposing surfaces 284, 286 which capture and retain other portions of support system 232 as will be described in greater detail hereafter.

Figure 7:
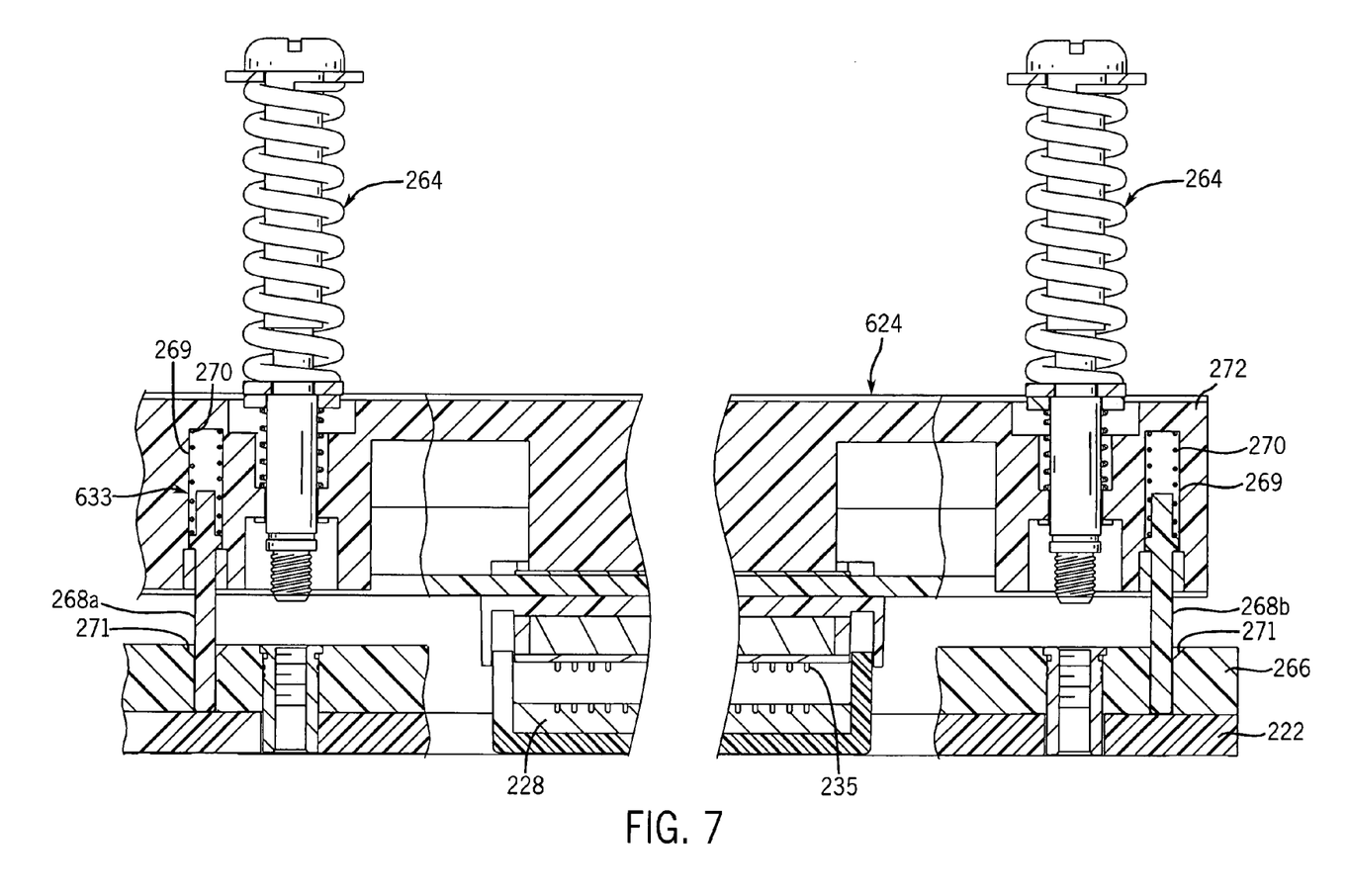
FIG. 7 is a sectional view of the computing system shown in FIGS. 1-5 taken along lines 7–7 of FIG. 2 illustrating an alignment assist system with portions of the computing system omitted for purposes of illustration.

Alignment assist system 231 assists in aligning connector portions 228 and 235 prior to being connected to one another. Alignment assist system 231 is disclosed in greater detail in co-pending U.S. patent application Ser. No. 10/661,433, filed on Sep. 12, 2003 by Gregory S. Meyer and Alisa C. Sandoval, entitled "Circuit Board Assembly," the full disclosure of which is hereby incorporated by reference. As shown by FIGS. 2 and 7 (illustrating component 624 which also includes system 231), alignment assist system 231 includes alignment members 268a, 268b, bores 269, springs 270 and alignment members 271. Alignment members 268 generally comprise structures, such as pins, retained within the alignment members 268a, 268b, retained within bores 269 within heat sink 262 and resiliently biased by springs 270 also captured within bores 269. Alignment members 271 generally comprise detents, such as blind holes, formed within brackets 266. Prior to connector portions 228 and 235 being connected to one another, alignment members 268a, 268b contact or engage alignment members 271 to better align connector portions 228 and 235. During the completion of the connection of connector portions 228 and 235, alignment members 268a, 268b compress springs 270 within bores 269.

In alternative embodiments, alignment members 268a, 268b, and alignment members 271 may be reversed such that alignment members. 268a, 268b extend away from circuit board 222 while alignment member 271 is coupled to heat sink 262. In still other embodiments, alignment assist system 231 may alternatively comprise alignment pins fixedly coupled to and extending from heat sink 262, wherein the alignment pins extend further into or even through holes within circuit board 222 as connector portions 228 and 235 are fully connected to one another. In still other embodiments, alignment assist system 231 may have other configurations or may be omitted.

Component support system 232 supports or assists in supporting and retaining the electronic component 224 relative to circuit board 222 to control the spacing between the electronic component 224 and circuit board 222. Support system 232 assists in appropriately supporting connector portions 228 and 235 relative to one another. Component support system 232 is described in greater detail in co-pending U.S. patent application Ser. No. 10/680,445 filed on Oct. 7, 2003 by Stephan K. Barsun, Gregory S. Meyer, Bryan D. Bolich and S. Daniel Cromwell, and entitled "Circuit Board Assembly", the full disclosure of which is hereby incorporated by reference. Support system 232 supports the cantilevered mass of electronic component 224 relative to circuit board 222 to prevent damage to connector portions 228 and 235. As best shown by FIG. 5, support system 232 includes two support assemblies 290 generally located in the corners of end 246 of electronic component 224 most distant from connector portion 235. As best shown by FIG. 5, support assembly 290 includes support structure 254, support structure 256 and intermediate coupling structure 258.

In the embodiment shown, support structure 254 comprises a member having an internally threaded bore 291 coupled to circuit board 222 and frame 223. Support structure 256 comprises a member coupled to electronic component 224 so as to be retained against linear movement in both directions along axis 242 while at the same time being permitted to move relative to electronic component 224 in at least one direction perpendicular to axis 242. In particular, structure 256 moves or floats within the larger inner passage defined by post 276. Coupling structure 258 generally extends through support structure 256 while being threaded or screwed to structure 256. Coupling structure 258 is further threaded or screwed into bore 291 of structure 254. Because structure 254 floats relative to post 276 to accommodate tolerance variations and misalignments, the coupling of electronic component 224 to circuit board 222 is facilitated. Once structure 258 is screwed to structure 254, support assemblies 290 retain electronic component 224 relative to circuit board 222 in both directions along axes 242.

Offset compensation system 233 further facilitates the coupling of electronic component 224 to circuit board 222. Offset compensation system 233 generally comprises one or more resilient support members asymmetrically located about the connection axis 244 along which connector portion 235 connects to connector portion 228 so as to exert a force against circuit board 222 and electronic component 224 to compensate for the additional mass of electronic component 224 at end 246 of electronic component 224. As discussed above, because the center of gravity or center of mass of electronic component 224 is not generally aligned with connection axis 244, electronic component 224 experiences a first torque about tilt or pivot axis 252 (shown in FIG. 3) during the connection of connector portions 230 and 228. Offset compensation system 233 exerts a force against component 224 to compensate for the excess mass at end 246 and to apply a second torque opposite to the first torque prior to connection of connector portions 228 and 235. In one particular embodiment, the second torque about pivot axis 252 is substantially equal to the first torque about axis 252 in magnitude. Offset compensation system 233 reduces the tendency for component 224 to tilt during the connection of components 228 and 230. As a result, compensation system 233 reduces the likelihood of the pins or other connection devices associated with connector portions 228 and 235 from becoming damaged due to misalignment caused by the tilting of electronic component 224.

Figure 3:
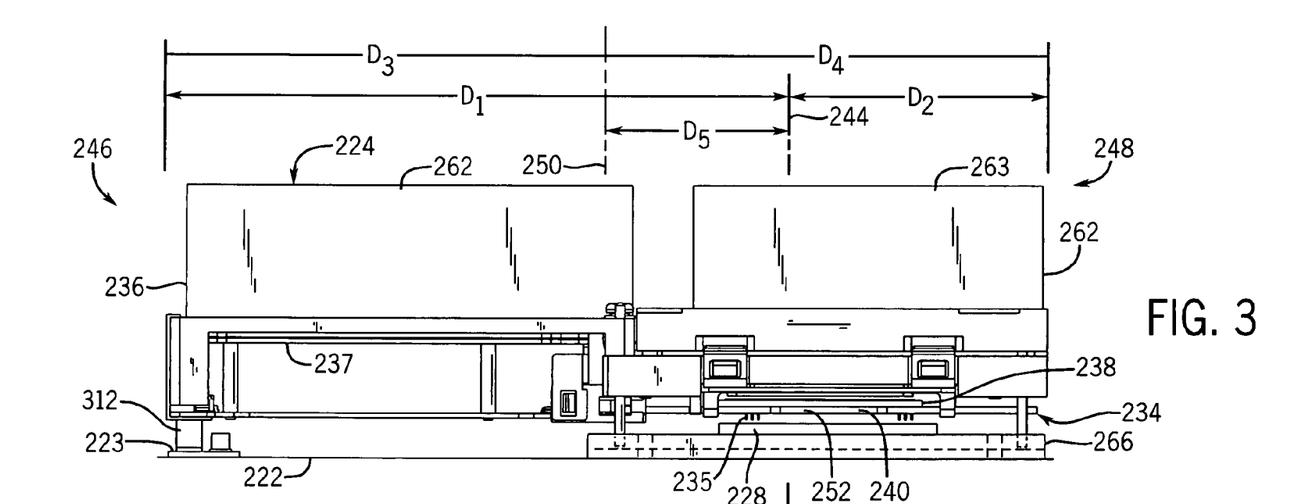
FIG. 3 is a side elevational view of the computing system of FIG. 2 illustrating an offset compensation system interacting with the electronic component and the circuit board prior to connection of connector portions associated with the electronic component and the circuit board.
Figure 4:
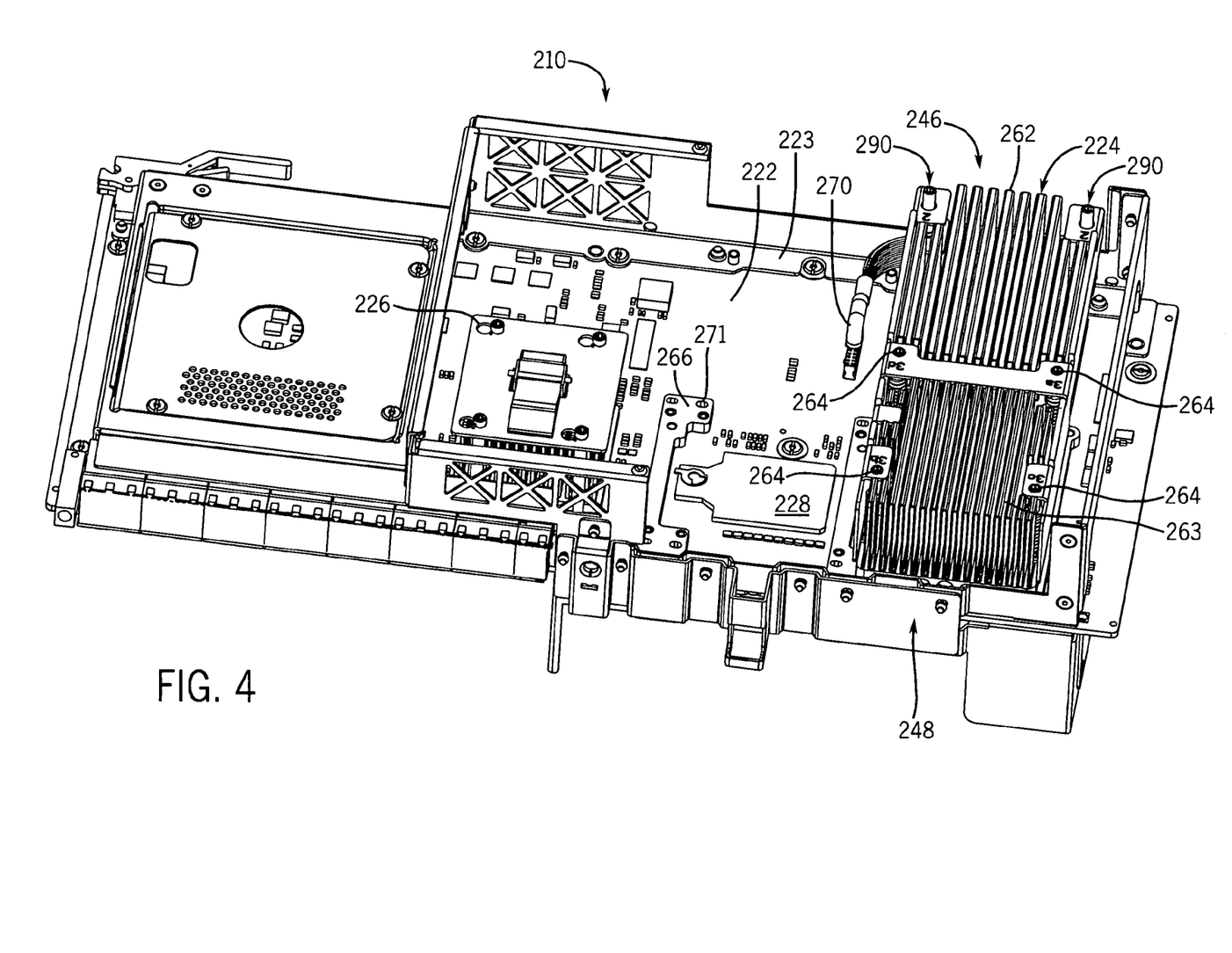
FIG. 4 is a top perspective view of the computing system of FIG. 2 illustrating the electronic component mounted to the circuit board.

FIGS. 3–5 illustrate the coupling or mounting of electronic component 224 to circuit board 222 and the use of compensation system 233 in greater detail. In particular, FIG. 3 illustrates electronic component 224 being moved closer to circuit board 222 just prior to the complete connection of connector portion 235 to connector portion 228. FIG. 4 illustrates component 224 completely connected to circuit board 222. FIG. 5 illustrates compensation system 233 at end 246 in greater detail. As shown by FIGS. 3 and 5, offset compensation system 233 includes resilient support members 310, 312. Support members 310 and 312 each generally comprises a leaf spring coupled to platform 272 of electronic component 224 and configured to extend into engagement with either frame 223 or circuit board 222 as component 224 is being moved closer to circuit board 222. As shown by FIG. 3, support members 310 and 312 (support member 312 is shown in FIG. 3) extend beyond posts 276 and beyond connector portion 235 prior to connection of connector portion 235 to connection portion 228. As connector portion 235 is moved into complete connection with connector portion 228, support members 310 and 312 are compressed. As members 310, 312 are being compressed, they exert a force against end 246 of electronic component 224 in the direction indicated by arrow 314. In the particular embodiment illustrated, support members 310 and 312 exert a force away from and generally perpendicular to circuit board 222. Support members 310 and 312 are configured to exert combined force approximately equal to the torque about axis 252 caused by the center of gravity or mass of component 224 being offset from axis 244.

In the particular example embodiment illustrated, the center of gravity of electronic component 224 is generally located at a longitudinal center of electronic component 224. Component 224 has a total mass of approximately two pounds. Support members 310 and 312 are configured to exert a combined force of approximately one pound to resist the tendency of component 224 to tilt as connector portions 228 and 235 are being connected.

As further shown by FIG. 5, once connector portions 228 and 235 have been connected, coupling structures 258 are screwed to support structures 254 to further retain end 246 along axes 242. In the embodiment illustrated, support members 310 and 312 remain compressed between platform 272 of electronic component 224 and frame 223. In alternative embodiments, members 310 and 312 may be configured to be removed from between electronic component 224 and circuit board 222 or frame 223 once connector portions 228 and 235 are connected to one another and once end 246 is axially retained relative to circuit board 222. Although offset compensation system 233 is illustrated as including two support members 310, 312 generally situated between posts 276, system 233 may alternatively include a single resilient support member asymmetrically positioned relative to axis 244 to support end 246. In addition, the one or more resilient support members 310, 312 may be located at other locations between end 246 and axis 244. Because the center of gravity of electronic component 224 is situated between support members 310, 312 and axis 244, system 233 has a more stabilizing effect during the connection of connector portions 228 and 235. However, in alternative embodiments, support members 310 and 312 may alternatively be situated between the center of gravity of electronic component 224 and axis 244.

The term "asymmetric" as used with respect to offset compensation system 233 in this disclosure means that system 233 includes either a single resilient support member without an opposite corresponding support member symmetrically positioned relative to axis 244 or a plurality of resilient support members which are not equally spaced from axis 244 and opposite to one another with respect to axis 244.

Figure 6:
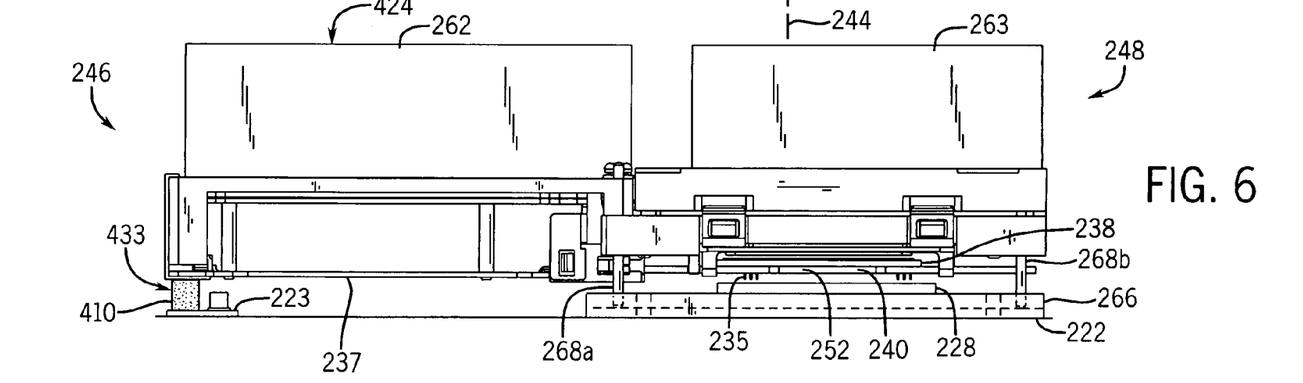
FIG. 6 is a side elevational view of an alternative embodiment of the computing system of FIGS. 1–5 illustrating a first alternative embodiment of the offset compensation system interacting with the electronic component and the circuit board prior to interconnection of the connector portions associated with the electronic component and the circuit board.

FIG. 6 illustrates electronic component 424, a first alternative embodiment of electronic component 224. Electronic component 424 is identical to electronic component 224 except that electronic component 424 includes offset compensation system 433 in lieu of offset compensation system 233. FIG. 6 illustrates electronic component 424 being positioned with respect to circuit board 222 just prior to the complete connection of connector portions 228 and 235. Like offset compensation system 233, offset compensation system 433 is located proximate to end 246 and is configured to resiliently engage circuit board 222 (or frame 223) prior to complete connection or connector portions 228 and 235. Like compensation system 233, compensation system 433, as it is being compressed, exerts a force in the direction indicated by arrow 314 to compensate for the offset of the center of gravity of component 424 relative to axis 244. Unlike compensation system 233, compensation system 433 utilizes one or more resilient support members formed from one or more resilient or compliant foam materials. In the embodiment shown, member 433 comprises a single bar 410 of resilient foam material which is adhered to electronic component 424. In alternative embodiments, compensation system 433 may alternatively comprise a greater number of such foam resilient support members located at numerous asymmetric positions relative to axis 244. In other embodiments, bar 410 (or bars 410) may be coupled to electronic component 424 by means other than adhesive, may be coupled to circuit board 222 or frame 223 prior to the connection of connector portions 228 and 235 or may be positioned between electronic component 424 and circuit board 222 or frame 223 prior to the connection of connector portions 228, 230 without being adhered or otherwise fastened to either or electronic component 424 or one of circuit board 222 or frame 223.

Although resilient support members 310, 312 and 410 are illustrated as being positioned between posts 276, support members 310, 312 and 410 may alternatively extend at least partially about post 276, wherein post 276 extend around or through members 310, 312 and 410. Although offset compensation systems 233 and 433 are illustrated as being utilized with components 224 and 424, offset compensation systems 233 and 433 may alternatively be utilized with other electronic components in lieu of electronic components 224 or 424 having connector portions offset from the center of mass of the electronic component.

FIG. 7 illustrates electronic component 624, a second alternative embodiment of electronic component 224. Electronic component 624 is similar to electronic component 224 except that electronic component 624 includes offset compensation system 633 in lieu of offset compensation system 233. Offset compensation system 633 is different from offset compensation systems 233 and 433 in that offset compensation system 633 is incorporated as part of alignment assist system 231. In particular, springs 270 associated with the alignment members 268a that are generally located between connector portion 235 and end 246 have a greater spring constant as compared to the springs 270 associated with alignment members 268b generally located between connector portion 235 and the opposite end 248 of electronic component 624. In other words, springs 270 associated with alignment members 268a require a greater force to be compressed as compared to springs 270 associated with alignment members 268b. The larger spring constant of springs 270 associated with alignment members 268a is generally established so as to compensate for the additional mass of electronic component 624 between axis 244 and end 246 as compared to the mass of electronic component 624 between axis 244 and the opposite end 248. As connector portions 228 and 235 are being moved closer to one another, the ends or tips of alignment members 268a, 268b engage the bottom of blind holes serving as alignment members 271 prior to connection of connector portions 228 and 235. As connector portions 228 and 235 are brought into complete engagement and connection with one another, the springs 270 are compressed. Due to their greater spring constants, springs 270 associated with alignment members 268a exert a greater force than springs 270 associated with alignments members 268b to minimize or prevent the tendency of electronic component 624 to tilt due to the center of mass of electronic component 624 being offset relative to the connection axis 244.

In alternative embodiments, offset compensation system 633 may be provided independent of or in addition to alignment assist system 231. For example, alignment members 271 may be omitted, wherein the resiliently biased members 268a engage bracket 266, frame 223 or circuit board 222 prior to connector portions 228 and 235 being connected to one another, whereby members 268a do not perform an alignment function but assist in compensating for the connector portion 235 being offset from the center of mass of electronic component 624. In another embodiment, springs 270 associated with alignment members 268a and 268b may have equal spring constants, wherein offset compensation system 633 includes additional resiliently biased members coupled to heat sink 262 and configured to engage either bracket 266, frame 223 or circuit board 222 prior to complete connection of connector portions 228 and 235. In still other embodiments, such resiliently biased members (i.e., spring biased pins) may alternatively be coupled to circuit board 222 and configured to engage a surface associated with or coupled to electronic component 624 prior to complete connection of connector portions 228 and 235. In such alternative embodiments, the resilient member (i.e., spring, etc.) has a spring constant chosen so as to compensate for the extra mass of electronic component 624 located to one side of connector portions 228, 235.

Although the present invention has been described with reference to example embodiments, workers skilled in the art will recognize that changes may be made in form and detail without departing from the spirit and scope of the invention. For example, although different example embodiments may have been described as including one or more features providing one or more benefits, it is contemplated that the described features may be interchanged with one another or alternatively be combined with one another in the described example embodiments or in other alternative embodiments. Because the technology of the present invention is relatively complex, not all changes in the technology are foreseeable. The present invention described with reference to the example embodiments and set forth in the following claims is manifestly intended to be as broad as possible. For example., unless specifically otherwise noted, the claims reciting a single particular element also encompass a plurality of such particular elements.

What is claimed is:

1. A computing system comprising:
   a circuit board;
   a first connector portion electrically connected to the circuit board;
   an electronic component including:
   a first electronic device;
   a second connector portion electrically coupled to the electronic device and connected to the first connector portion along an axis; and
   a plurality of resilient support members asymmetrically located about the axis and extending between the device and the circuit board.

2. The system of claim 1, wherein the plurality of resilient support members are in a compressed state.

3. The system of claim 1, wherein the plurality of resilient support members are configured to engage the circuit board prior to engagement of the second connector portion with the first connector portion.

4. The system of claim 1, wherein one of the first connector portion and the second connector portion includes a plurality of sockets and wherein the other of the first connector portion and the second connector portion includes a plurality of pins received within the plurality of sockets.

5. The system of claim 1, wherein the first electronic device comprises an integrated circuit chip.

6. The system of claim 5 including a first heat sink thermally coupled to the integrated circuit chip.

7. The system of claim 6 including a power supply electrically connected to the integrated circuit chip and extending on one side of the second connector portion.

8. The system of claim 7 including a second heat sink thermally coupled to the power supply.

9. The system of claim 7, wherein the plurality of support members extend between the power supply and the circuit board.

10. The system of claim 7, wherein at least a portion of the power supply extends between at least one of the plurality of support members and the second connector portion.

11. The system of claim 1 including a plurality of guide members symmetrically located about the axis.

12. The system of claim 11, wherein the plurality of guide members comprises four guide members.

13. The system of claim 1, wherein the plurality of support members includes at least one spring.

14. The system of claim 1, wherein the plurality of support members includes at least one resilient foam member.

15. The system of claim 1, wherein the plurality of resilient support members are carried by the electronic component.

16. A computing component comprising:
a first electronic device;
a first connector portion electrically connected to the first device and configured to be electrically connected to a second connector portion coupled to a circuit board along a first axis;
a first resilient support member coupled to the electronic device and extending beyond the first connector portion so as to resiliently engage the circuit board or a structure coupled to the circuit board prior to the first connector portion being connected to the second connector portion;
a second resilient support member coupled to the electronic device and extending beyond the first connector portion so as to resiliently engage the circuit board or the structure coupled to the circuit board prior to the first connector portion being connected to the second connector portion, wherein the first resilient support member and the second resilient support member are asymmetrically positioned relative to the first axis.

17. The component of claim 16, wherein one of the first connector portion and the second connector portion includes a plurality of sockets and wherein the other of the first connector portion and the second connector portion includes a plurality of pins received within the plurality of sockets.

18. The component of claim 16, wherein the first electronic device comprises an integrated circuit chip.

19. The component of claim 18 including a first heat sink thermally coupled to the integrated circuit chip.

20. The component of claim 19 including a power supply electrically connected to the integrated circuit chip and coupled to the integrated circuit chip as a unit while extending on one side of the second connector portion.

21. The component of claim 20 including a second heat sink thermally coupled to the power supply.

22. The component of claim 16 including a plurality of guide members symmetrically located about the axis.

23. The component of claim 22, wherein the plurality of guide members comprises four guide members.

24. The component of claim 16, wherein the plurality of support members includes at least one spring.

25. The component of claim 16, wherein the plurality of support members includes at least one resilient foam member.

26. The component of claim 16, wherein the component has a first longitudinal end and a second opposite longitudinal end, wherein the first connector portion has a longitudinal center spaced from the first end by a first distance and wherein the first resilient support member is located between the first connector portion and the second end and is spaced from the longitudinal center of the first connector portion by a second distance greater than the first distance.

27. The component of claim 16, wherein the first resilient support member is carried by the electronic component.

28. A processor component comprising:
a processor device;
a first connector portion electrically connected to the processor device and configured to be connected to a second connector portion connected to a circuit board;
a power supply electrically connected to the processor device so as to supply power to the processor device;
at least one heat sink thermally coupled to the processor device and the power supply; and
a first resilient support member extending beyond the first connector portion and configured to be compressed during connection of the first connector portion to the second connector portion, wherein at least a portion of the power supply extends between the first support member and the first connector portion.

29. The processor component of claim 28 including a second resilient support member extending beyond the first connector portion and configured to be compressed during connection of the first connector portion to the second connector portion, wherein at least a portion of the power supply extends between the second support member and the first connector portion.

30. The processor component of claim 29, wherein the first resilient support member and the second resilient support member are asymmetrically positioned relative to the first connector portion.

31. The component of claim 28, wherein the first resilient support member is carried by the component prior to the first connector portion being connected to the second connector portion.

32. A computing system comprising:
a circuit board;
a first connector portion electrically connected to the circuit board; and
an electronic component having a first end and a second opposite end, the electronic component including:
an electronic device;
a second connector portion electrically connected to the electronic device and electrically connected to the first connector portion along a first axis closer to the first end than the second end; and
means on opposite sides of the first axis for resiliently supporting the second end relative to the circuit board as the first connector portion is being connected to the second connector portion.

33. A method for connecting an electronic component having a first end, an opposite second end, an electronic device, and a first connector portion closer to the first end than the second end, to a circuit board having a second connector portion, the method comprising:
substantially aligning the first connector portion with the second connector portion along an axis; and
resiliently supporting the second end as the first connector portion is moved into interconnection with the second connector portion with a plurality of resilient support members asymmetrically located about the axis.

34. A computing system comprising:
a circuit board;
a first connector portion electrically connected to the circuit board;
an electronic component having a center of mass and including:
an electronic device; and
a second connector portion electrically connected to the electronic device and configured to be coupled to the first connector portion along a connection axis offset from the center of mass, whereby the electronic component experiences a first torque about a tilt axis perpendicular to and intersecting the connection axis; and
an offset compensation system including:
at least one force applying mechanism coupled to one of the circuit board and the electronic component and configured to apply force to the other of the circuit board and the electronic component at at least one location such that a second opposite torque about the tilt axis is exerted to the electronic component prior to connection of the first connector portion and the second connector portion.

35. The system of claim 34, wherein the second opposite torque is substantially equal to the first torque in magnitude.

36. The system of claim 34, wherein the center of mass of the electronic component extends between the connection axis and the at least one location at which force is applied.

37. The system of claim 34, wherein the at least one force applying mechanism includes at least one spring.

38. The system of claim 34, wherein the at least one force applying mechanism includes at least one resilient foam material.

39. The system of claim 34 wherein the at least one force applying mechanism includes a resilient member resiliently supporting the force applying member.

40. A computing system comprising:
a circuit board;
a first connector portion electrically connected to the circuit board;
an electronic component having a center of mass and including:
an electronic device; and
a second connector portion electrically connected to the electronic device and configured to be coupled to the first connector portion along a connection axis offset from the center of mass, whereby the electronic component experiences a first torque about a tilt axis perpendicular to and intersecting the connection axis; and
an offset compensation system including:
means for applying to the electronic component a second torque about the tilt axis opposite to the first torque prior to connection of the first connector portion and the second connector portion.

41. The system of claim 40, wherein the second torque is substantially equal to the first torque in magnitude.

42. An offset compensation system for use with an electronic component having a first connector portion connected to a second connector portion associated with a circuit board, wherein the electronic component has a center of mass offset from a connection axis along which the first connector portion and the second connector portion connect such that the electronic component experiences a first torque about a tilt axis perpendicular to and intersecting the connection axis, the offset compensation system including:
at least one force applying mechanism configured to be coupled to one of the circuit board and the electronic component and configured to apply force to the other of the circuit board and the electronic component at at least one location such that a second opposite torque about the tilt axis is exerted to the electronic component prior to connection of the first connector portion and the second connector portion.

* * * * *